Nov. 21, 1967     A. C. GERVAIS     3,353,297

MACHINE FOR LAYING A CONTINUOUS PROTECTIVE SHEET

Filed April 22, 1966     3 Sheets-Sheet 1

INVENTOR
Adrien C. GERVAIS

ATTORNEYS

Nov. 21, 1967  A. C. GERVAIS  3,353,297
MACHINE FOR LAYING A CONTINUOUS PROTECTIVE SHEET
Filed April 22, 1966  3 Sheets-Sheet 2

INVENTOR
Adrien C. GERVAIS

Fetherstonhaugh & Co.
ATTORNEYS

Nov. 21, 1967  A. C. GERVAIS  3,353,297
MACHINE FOR LAYING A CONTINUOUS PROTECTIVE SHEET
Filed April 22, 1966  3 Sheets-Sheet 3

*INVENTOR*
Adrien C. GERVAIS

*ATTORNEYS*

United States Patent Office 3,353,297
Patented Nov. 21, 1967

3,353,297
MACHINE FOR LAYING A CONTINUOUS
PROTECTIVE SHEET
Adrien C. Gervais, 47 Scott St., Kitchener,
Ontario, Canada
Filed Apr. 22, 1966, Ser. No. 544,506
10 Claims. (Cl. 47—1)

The present invention relates to a unit for the positioning of a continuous layer of perforated plastic sheeting over a previously planted row of plant seeds or seedlings to provide a protective cover for such seedlings.

The invention relates particularly to apparatus and method for the forming of compacted soil banks along both sides of a previously planted row of seeds or seedlings and to the laying of a continuous sheet of perforated plastic film over the formed soil banks, to provide a protective cover and greenhouse type enclosure for the seedlings.

The protection of young seedlings is particularly advantageous during cold weather to prevent frost damage, and by employing the apparatus of the present invention it is possible to commence spring planting two, three or more weeks earlier than usual. An equally important advantage lies in the fact that the compacted soil banks accumulate heat during the daytime, and this heat is effectively retained in the banks by the plastic covering thereover and provides protection against frost during the nighttime and early morning. In addition to advancing and lengthening the growing season the enclosure provided by the present unit also protects the young plants from the harmful effect of wind, blowing dust and sand, and heavy downpours of rain or hail. The provision of a perforated, transparent protective cover also assists in the establishment of the root and stalk structure of young plants as the daytime temperature within the enclosure will always be higher than the ambient temperature due to the greenhouse nature of the enclosure. Such an enclosure also prevents excess moisture evaporation from the soil by shielding the soil from evaporating wind thus providing the seedlings with much needed moisture.

It is the primary object of the present invention to provide method and means for positioning a protective continuous length of a perforated plastic film over a row of previously planted plants, seeds or seedlings.

It is a further object to provide apparatus for movement along a row of planted seedlings which unit will shape and form continuous compacted soil banks along each side of the row of seedlings and will immediately thereafter position a continuous sheet of perforated plastic over the two compacted banks and "tuck" the edges of the continuous sheet into the soil banks to prevent or minimize displacement of the sheet by wind or rain.

It is another object of the present invention to provide a unit for positioning a protective continuous sheet of perforated plastic over a row of previously planted seedlings, said unit being designed to travel along a row of seedlings and consisting of a frame and a pair of forwardly diverging plow blades, or discs, carried by the frame and adapted to displace soil inwardly toward the row of seedlings, and a pair of side guards carried by the frame to prevent burying of the seedlings by the inwardly displaced soil and against which the soil is piled, and a pair of flanged rotatably mounted compacting wheels carried by the frame and adjacent the side guards to compact the soil into two solid banks, one on each side of the row of seedlings, and a roll of perforated plastic sheeting carried on the frame and a guide roller for positioning sheeting unwound from the roll over the two banks of compacted soil, and two tucking wheels for wedging or tucking the outer edges of the plastic sheeting into the soil banks to prevent or reduce displacement of the sheet by wind or rain.

It is still a further object to provide a unit as described immediately above which is self-propelled and self-contained.

These and other objects and advantages will become apparent from the following description in conjunction with the accompanying drawings wherein.

Figure 1:
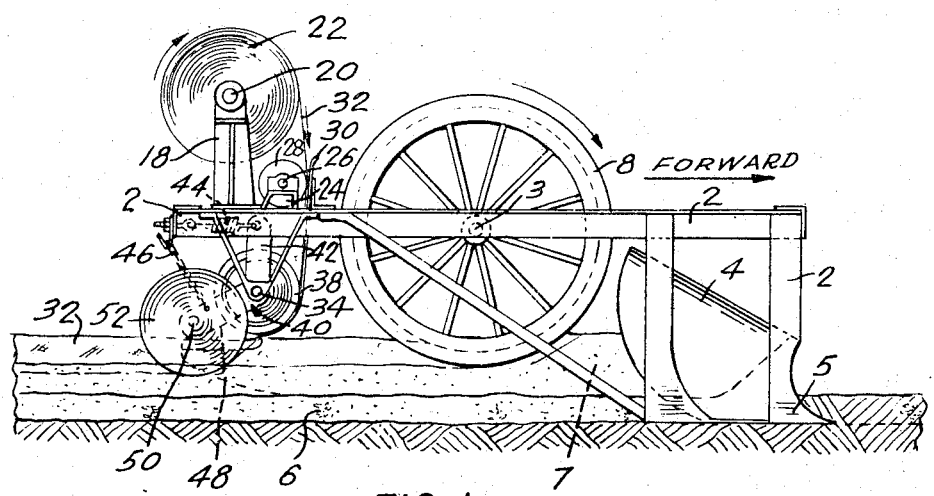
FIGURE 1 illustrates in side view the apparatus according to the present invention to be attached to and pulled by a tractor or other mode of power.
Figure 2:
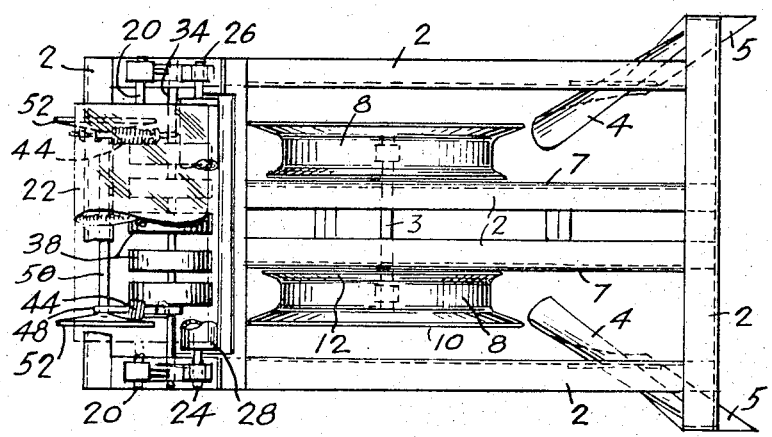
FIGURE 2 illustrates in plan view the embodiment of the invention shown in FIG. 1, with the roll of perforated plastic sheeting removed for clarity.
Figure 3:
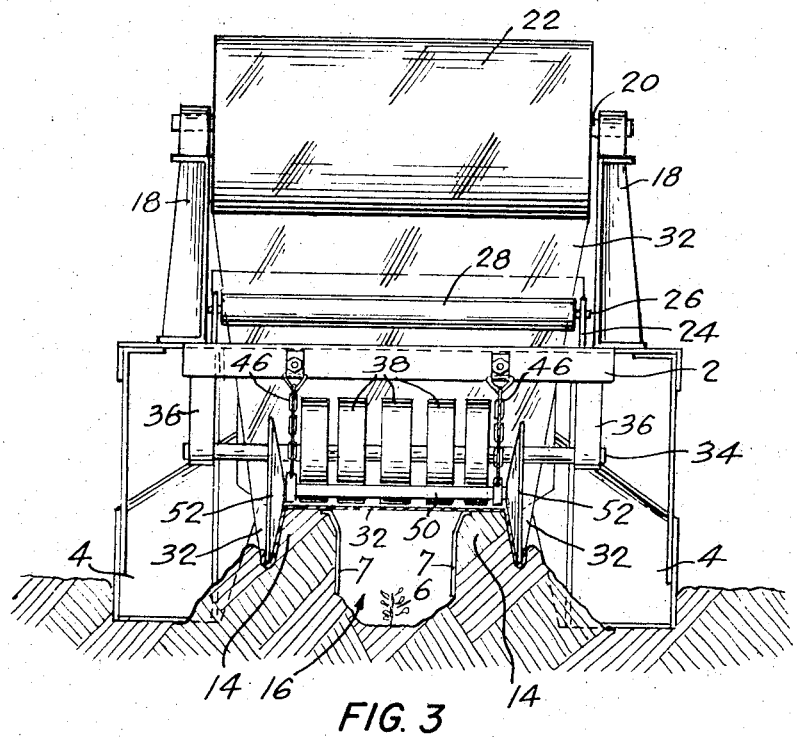
FIGURE 3 illustrates in rear view the embodiment of the invention shown in FIG. 1.

FIGURES 1, 2 and 3 illustrate one embodiment of the invention side, top and rear views respectively. The apparatus consists of a frame 2, at the forward end of which are positioned two forwardly diverging plow blades or guides 4. It will be understood that discs may be used in place of plow blades 4, the choice depending upon the type of soil being worked. As the apparatus is pulled along and over a row of freshly planted seedlings, the plow blades 4, the tips 5 of which are positioned somewhat below the level of the ground, displace soil inwardly toward the seedlings 6. The inwardly directed soil is prevented from burying the seedlings 6 by the provision of side guards 7 which extend parallel to the row of seedlings on each side thereof, and against which the soil displaced by the plow blades 4 is piled.

Rotatably carried by the frame 2 as by means of shaft 3, and positioned immediately behind the plow blades 4 and adjacent the side guards, are two soil compacting wheels 8. The periphery of each wheel 8 is provided with an outer flange 10 and an inner flange 12 (see FIG. 2), the innermost flanges 12 bearing against the outermost surfaces of side guards 7. As the apparatus is pulled along over a row of seedlings the plow blades 4 displace soil inwardly against side guards 7 and the soil is then compacted by flanged compacting wheels 8 to form soil banks 14 as will clearly be seen from FIG. 3. The formation of the soil banks 14 results in a trench 16 within which the seedlings 6 are located.

It is proposed that the depth to which the plow guides 4 enter the ground, and the height and lateral positioning of the side guards 7, and the height of the compacting wheels 8, will be adjustable to enable variations in the height and width of the seedling-containing trench depending upon the type of the soil and the size and nature of the seedling plants to be protected.

Provided at the rear of the frame are supporting brackets 18 which carry axle 20 upon which is rotatably mounted a roll 22 of perforated plastic (or otherwise) sheeting. For purposes of clarity this roll 22 has been omitted from the view shown in FIG. 2. Also carried by the frame 2 are brackets 24 which carry shaft 26 upon which an idler roller 28 is rotatably mounted. A guide shield or plate 30 (see FIG. 1) may be mounted forward of idler roller 28 to protect and guide the layer of plastic sheeting 32 as it is unwound from roll 22.

Rotatably carried by axle 34 carried by depending brackets 36 are a series of guide rollers 38, around which the plastic sheeting travels.

Axle 34 also provides the pivot point for two bell-crank levers 40. The uppermost arm 42 of each bell crank lever 40 is attached to the rearward end of frame 2 by springs 44 which urge the pivoting of lever 40 at 34 to the extent provided by chain or stops 46 which connects the other end 48 of lever 40 to the frame 2. The lowermost ends of arms 48 carry an axle 50 upon each end of which is rotatably mounted tucking wheels 52. The mounting of the tucking wheels 52, on bell-crank lever 40, enables springs 44 to exert the required downward pressure on the wheels 52, while at the same time allowing the tucking wheels to move upwardly to pass over stones or other objects.

The sheet 32 of perforated plastic film, which is to be laid along the length of the trench 16 containing the seedlings 6, is unwound from roll 22 and passes downwardly between idler roller 28 and guide shield 30 and over guide rollers 38 where it is laid over the top of banks 14 formed by compacting wheels 8. The edges of the plastic sheeting pass under tucking rollers 52 and are pressed into the soil bank which, after the passing of tucking wheels 52, will collapse somewhat securing the edges and holding the film stretched across the top of the banks. The laying of the sheeting on the banks 14, and the "tucking in" of the edges, is clearly shown in FIG. 3.

Thus in operation, as the apparatus is moved along over a row of seedlings, two parallel piles or banks of soil are provided by plow blades 4, side guards 7, and compacting wheels 8. A layer of perforated plastic sheeting is laid along the tops of the banks by guide rollers 38, and the edges of the sheeting are "tucked in" the soil banks by the tucking wheels 52.

After the seedling plants have become established, and/or the risk of frost killing is minimal, the layer of plastic sheeting can be removed by a suitable plastic sheet picking and rolling apparatus, and the plastic sheeting stored for future use.

The apparatus shown in FIGS. 1, 2 and 3 may be mounted on wheels (not shown) to be pulled along behind a tractor, or may be carried by a tractor and height adjustments made through the tractor's hydaulic system. It is proposed that with the above described apparatus all rotating components be rotated through frictional contact between the plastic sheeting 32 and the soil. It may be found advantageous however to provide the apparatus with power means, such as a gasoline engine, to rotate such components as the compacting wheels 8 and guide rollers 38, or this may be accomplished by suitable transmission of power from the tractor power take-off.

A second and preferred embodiment of the invention is shown in FIGS. 4, 5, 6 and 7. These drawings illustrate the apparatus as a self-contained self-propelled unit, mounted on rear wheels 54 and front wheels 56 and having a motor provided within motor housing 58 to provide locomotive power and power to drive any of the rotating components as required, and a seat 60 for the operator, and steering assembly comprising wheel 62 and linkage 64.

Figure 4:
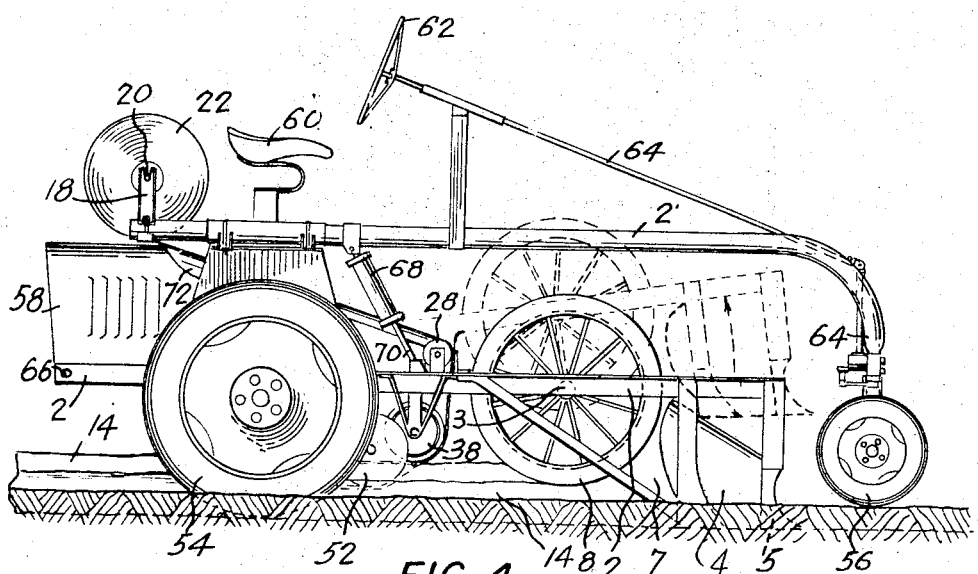
FIGURE 4 illustrates in side view a second embodiment of the invention wherein the apparatus forms part of a self-contained self-propelled unit.
Figure 5:
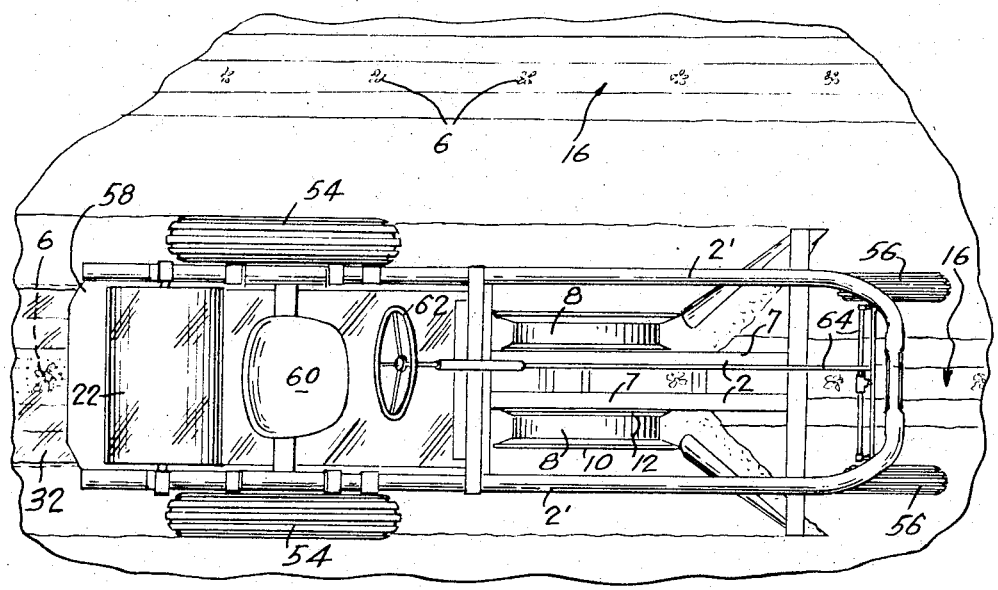
FIGURE 5 is a plan view of the self-propelled unit shown in FIG. 4.
Figure 6:
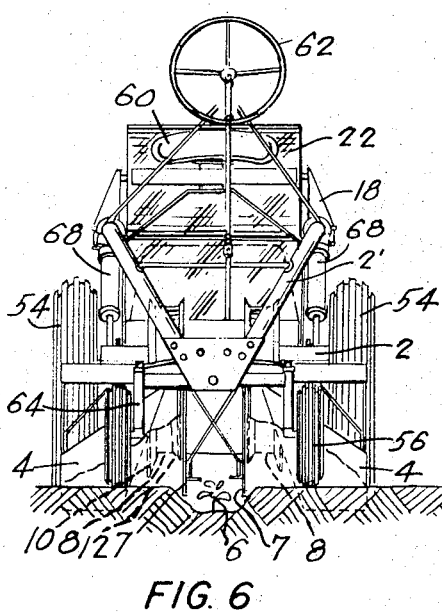
FIGURE 6 is a front view of the unit shown in FIG. 4.
Figure 7:
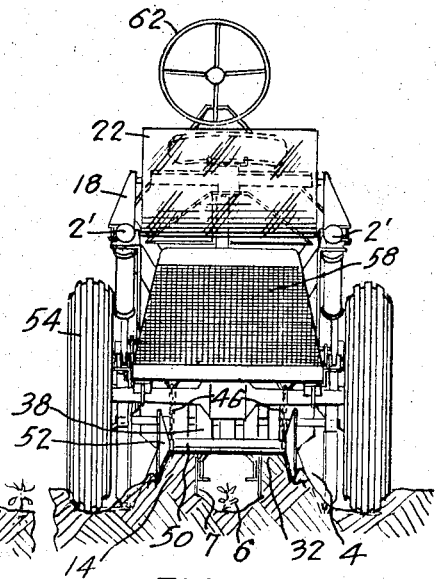
FIGURE 7 is a rear view of the unit shown in FIG. 4.

In the unit shown in FIGS. 4, 5, 6 and 7 the main frame is designated by numeral 2', and the secondary framing which carries the plow blades, compacting wheels 8, etc. is shown at 2. The frame 2 may be pivotally connected to the main framing member as at 66 in FIG. 4, and the height of the plastic laying apparatus controlled by hydraulic cylinder 68 and rod 70. The broken lines in FIG. 4 illustrate the framing 2 and components when in raised non-operational position and the full lines show the apparatus in sheet laying position.

As in FIGS. 1, 2 and 3, the forwardly diverging plow blades are shown at 4 (or discs may be substituted therefor), the side guards at 7, and the two soil compacting wheels at 8; these components cooperating to form the two parallel soil banks across which the plastic sheeting 32 is laid. The roll of perforated plastic sheet is shown at 22, the idler roller at 28, the guide rollers at 38, and the tucking wheels or discs at 52. In this embodiment the provision of a guide plate 72, between the roll 22 and idler roller 28, is necessary in view of the movement backward of the roll 22 to provide space for seat 60.

As in the case of the description given above in respect of FIGS. 1, 2 and 3, as the self-contained unit moves along a row of seedling plants, the plow blades 4 move soil inwardly against side guards 7, where the soil is compacted by wheels 8 to form a bank 14 of soil along both sides of the seedling row. A layer of perforated plastic from roll 22 is then led along guide plate 72, between idler roller 28 and guide plate 30, around guide rollers 38 and across the trench formed between the banks 14. The outer edges of the plastic sheet is then "tucked in" the soil banks by tucking wheels 52, to prevent movement of the plastic layer by wind or rain.

The soil compacting wheels 8 are freely rotatable around axle 3 and forward movement of the machine and the firm compacting contact between the soil banks will cause rotation of these wheels under most conditions. However to ensure rotation of wheels 8 at all times these wheels may be motor driven by the power unit in unison with wheels 54. Other modifications, such as the addition of weight to the front end of the self-propelled unit to assist steering control, or the redistribution of component parts, may be preferred or advisable without departing from the scope of the invention. A futher modification may reposition the roll of perforated plastic film 22 in the lower position of the motor and housing 58 and to reposition the motor and housing 58 above the repositioned roll 22. This would, under certain conditions, improve the run of the plastic film.

In the foregoing description particular emphasis has been placed on the use of the unit with shallowly planted seedlings, in which case it is necessary to form soil banks prior to the positioning of the plastic sheeting. It will be appreciated however that in instances of more deeply planted plants, where the plant is positioned some distance below the level of the ground, that the formation of soil banks may not be necessary, and it is necessary simply to position the plastic sheeting and to "tuck-in" the outside edges.

What I claim is:

1. Apparatus for positioning a continuous protective sheet over a row of previously planted seeds, seedlings, or the like, said apparatus being movable along the said row and comprising a frame having a forward end and a rearward end, and blade means carried by the forward end of the frame for forming and means for compacting two parallel soil banks one along each side of the seedling row, a pair of side guards mounted on the frame inwardly of said blade means, one guard positioned along each side of the row and against which soil displaced by the said blade means is piled, and a supply of protective sheeting carried at the rearward end of the frame, and a guide roller means mounted on the frame and adapted to receive the sheeting from the sheeting supply for positioning the sheeting unwound from the supply across the tops of the soil banks and over the said row, and means mounted on the frame rearwardly of the guide roller for tucking the outside edges of the continuous sheeting into the soil banks.

2. Apparatus for positioning a continuous protective sheet over a row of previously planted seeds, seedlings, or the like, said apparatus being movable along the said row and comprising a frame having a forward end and a rearward end, and means carried by the forward end of the frame for forming and compacting two parallel soil banks one along each side of the said row, and a supply of protective sheeting carried at the rearward end of the frame, and a guide roller means mounted on the frame and adapted to receive the sheeting from the sheeting supply for positioning the sheeting unwound from the supply across the top of the soil banks and over the said row, and means mounted on the frame rearwardly of the guide roller for tucking the outside of the edges of the continuous sheeting into the soil banks, and wherein the means for forming and compacting the soil banks comprises a pair of forwardly diverging plow blades mounted to displace soil inwardly toward the said row, and a pair of side guards mounted on said frame inwardly of said plough blades, one positioned along each side of the row and against which soil displaced by the plow blades is piled, and a pair of rotatable flanged compacting wheels mounted adjacent the side guards to compact the soil and form the soil banks.

3. Apparatus according to claim 2 wherein the means for tucking the outside edges of the plastic sheeting into the soil banks comprises a pair of rotatable tucking wheels which push the sheeting downwardly into the soil banks.

4. Apparatus according to claim 3 including means for adjusting the height of the plow blades, side guards, compacting wheels, guide roller and tucking wheels relative to the ground.

5. Apparatus according to claim 3 including spring means for urging the tucking wheels downwardly, thus enabling upward movement of the tucking wheels upon contact with stones or other objects.

6. Apparatus according to claim 2 including a power actuated vehicle, and means for mounting said frame thereon.

7. Apparatus according to claim 6 including power means for driving the compacting wheels.

8. Apparatus according to claim 2 further comprising an idler roller positioned between the supply and the guide roller and over which the sheeting is drawn.

9. Apparatus for positioning a protective enclosure over a row of plant seeds, seedlings, or the like, comprising soil displacing means mounted on said apparatus and movable along and at opposite sides of the row for displacing soil on opposite sides of the row to form a soil bank on each side of the row so that the said row is located in a trench between the banks, a pair of side guards positioned on said apparatus inwardly of said soil displacing means to prevent soil moved by said soil displacing means from entering the said row, and sheet laying means operatively connected to said soil displacing means and located rearwardly thereof for laying a continuous strip of protective enclosing material over the top of the said trench and over the said soil banks.

10. Apparatus as claimed in claim 9 including means operatively connected to said sheet laying means for forcing the lateral edges of said continuous strip into said soil bank to secure the strip in place over the trench.

References Cited
UNITED STATES PATENTS

| | | | |
|---|---|---|---|
| 1,787,902 | 1/1931 | Herfort | 47—9 |
| 2,078,872 | 4/1937 | Pfeiffer | 47—9 |
| 3,180,290 | 4/1965 | Kappelmann et al. | 47—9 |

ABRAHAM G. STONE, *Primary Examiner.*

ROBERT E. BAGWILL, *Examiner.*